(12) United States Patent
Masumoto

(10) Patent No.: US 9,174,613 B2
(45) Date of Patent: Nov. 3, 2015

(54) VEHICLE SPEED OPERATING DEVICE FOR WORK VEHICLE

(71) Applicant: Kubota Corporation, Osaka-shi (JP)

(72) Inventor: Koji Masumoto, Sakai (JP)

(73) Assignee: Kubota Corporation, Osaka (JP)

( * ) Notice: Subject to any disclaimer, the term of this patent is extended or adjusted under 35 U.S.C. 154(b) by 102 days.

(21) Appl. No.: 14/168,156

(22) Filed: Jan. 30, 2014

(65) Prior Publication Data

US 2014/0287871 A1 Sep. 25, 2014

(30) Foreign Application Priority Data

Mar. 25, 2013 (JP) ................................. 2013-062341

(51) Int. Cl.
*F16H 59/06* (2006.01)
*B60T 7/06* (2006.01)
*B60T 11/18* (2006.01)
*F16H 59/54* (2006.01)
*F16H 59/02* (2006.01)

(52) U.S. Cl.
CPC . *B60T 7/06* (2013.01); *B60T 11/18* (2013.01); *F16H 59/06* (2013.01); *F16H 59/54* (2013.01); *F16H 2059/0234* (2013.01); *Y10T 477/621* (2015.01)

(58) Field of Classification Search
CPC .................. B60K 2741/26; F16H 2059/0234; Y10T 74/20061
See application file for complete search history.

(56) References Cited

U.S. PATENT DOCUMENTS

| 4,759,417 | A | * | 7/1988 | Wanie et al. | ................. | 180/6.34 |
| 6,164,396 | A | | 12/2000 | Matsufuji | | |
| 2009/0260912 | A1 | * | 10/2009 | Isogai | ........................... | 180/336 |

FOREIGN PATENT DOCUMENTS

JP 10247119 A 9/1998

* cited by examiner

*Primary Examiner* — Richard Lorence
(74) *Attorney, Agent, or Firm* — The Webb Law Firm

(57) ABSTRACT

A vehicle speed operating device for a work vehicle has a shift pedal that is disposed on a first lateral surface side of a body frame and is linked to an operating shaft of a continuously variable transmission via a first mechanical linkage mechanism, and a brake pedal, a speed maintenance mechanism and a second mechanical linkage mechanism are arranged on a second lateral surface side of the body frame.

5 Claims, 6 Drawing Sheets

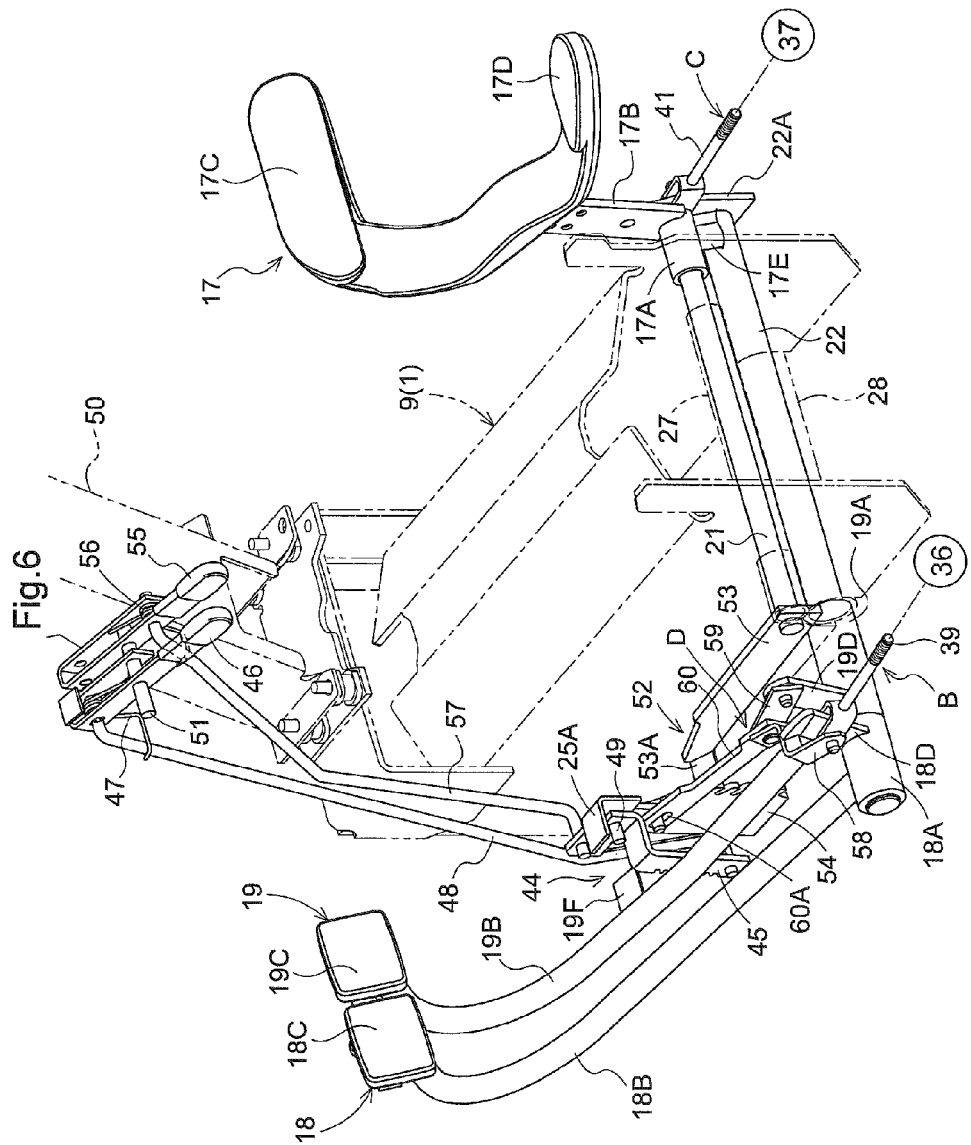

VEHICLE SPEED OPERATING DEVICE FOR WORK VEHICLE

CROSS-REFERENCE TO RELATED APPLICATIONS

This application claims priority to Japanese Patent Application No. 2013-062341 filed Mar. 25, 2013, the disclosure of which is hereby incorporated in its entirety by reference.

BACKGROUND OF THE INVENTION

1. Field of the Invention

The present invention relates to a vehicle speed operating device that is provided in a work vehicle having a body frame, a travel device and a brake for braking the travel device.

2. Description of the Related Art

In a vehicle speed operating device for a work vehicle disclosed in JP 10-247119A, for example, a mechanical linkage mechanism for shifting (first mechanical linkage mechanism), a shift lock mechanism (speed maintenance mechanism), a master brake pedal, a mechanical linkage mechanism for lock release and the like are disposed on a right lateral surface side of a body frame. The mechanical linkage mechanism for shifting consists of a forward travel pedal and a reverse travel pedal serving as shift pedals, a link that links these pedals to an operating shaft of a continuously variable transmission, and the like. The shift lock mechanism holds the shift pedals at a given shift position. The master brake pedal operates left and right brake pedals disposed on a left lateral surface side of the body frame in a two-pedal pressed state via a first brake pedal shaft and a simultaneous braking operation mechanism. The mechanical linkage mechanism for lock release includes a contacting portion of a lock arm and a lock release pin linking the master brake pedal to the shift lock mechanism such that the shift lock mechanism is released in tandem with the master brake pedal being pressed down.

SUMMARY OF THE INVENTION

In the configuration disclosed in JP 10-247119A, the operating force resulting from the master brake pedal being pressed down can be directly conveyed to the shift lock mechanism due to the shift lock mechanism, the master brake pedal and the mechanical linkage mechanism for lock release being disposed on the right lateral surface side of the body frame. The shift lock mechanism is thereby more readily released.

On the other hand, due to the forward travel pedal, the reverse travel pedal, the mechanical linkage mechanism for shifting and the like also being disposed on the right lateral surface side of the body frame, in addition to the shift lock mechanism, the master brake pedal and the mechanical linkage mechanism for lock release, these components are arranged in a complex configuration. As a result, the ease with which these components are assembled and maintained is adversely affected.

As for a brake deceleration operation that involves operating both side brakes, a first brake pedal shaft and a simultaneous braking operation mechanism need to be provided as a dedicated linkage mechanism for brake deceleration, from the master brake pedal disposed on the right lateral surface side of the body frame across to the left and right brake pedals disposed on the left lateral surface side of the body frame. This complicates the linkage structure for braking, which in turn adversely affects the ease with which assembly and maintenance is carried out.

Given that the operating force resulting from the master brake pedal being pressed down is conveyed to the side brakes in a roundabout way via the dedicated linkage mechanism for brake deceleration, the left and right brake pedals and the like, a decrease in braking performance caused by a loss of operating force during transmission due to backlash in the linkage mechanism and the like tends to occurs.

In view of the above situation, there is demand for a vehicle speed operating device for a work vehicle that enables a release operation of a speed maintenance mechanism to be carried out efficiently and smoothly, without complicating the linkage structure for braking.

The present invention is directed to a vehicle speed operating device that is provided in a work vehicle having a body frame, a travel device and a brake for braking the travel device, comprising:

a continuously variable transmission having an operating shaft;

a shift pedal disposed on a first lateral surface side that is one of left and right lateral surfaces of the body frame;

a first mechanical linkage mechanism linking the shift pedal on the first lateral surface side to the operating shaft;

a brake pedal disposed on a second lateral surface side that is the other of the left and right lateral surfaces of the body frame, and linked to the brake;

a linkage shaft rotatably provided on the body frame and passing laterally through the body frame;

a first projecting end portion, of the linkage shaft, projecting from the first lateral surface and having attached thereto one or both of the shift pedal and the first mechanical linkage mechanism;

a second projecting end portion, of the linkage shaft, projecting from the second lateral surface;

a speed maintenance mechanism linked to the second projecting end portion with a configuration capable of holding the operating shaft at a given shift position via the linkage shaft, and disposed on the second lateral surface side; and a second mechanical linkage mechanism disposed on the second lateral surface side, and linking the brake pedal to the speed maintenance mechanism, such that the speed maintenance mechanism is switched from a state of holding the operating shaft at a given shift position to a state of releasing the holding, in tandem with the brake pedal being pressed down.

According to this configuration, a shift operating system of a continuously variable transmission is constituted by arranging a shift pedal on a first lateral surface side of a body frame, and linking the shift pedal on the first lateral surface side to an operating shaft of the continuously variable transmission via a first mechanical linkage mechanism. A release operating system of a speed maintenance mechanism is constituted by disposing the speed maintenance mechanism and a second mechanical linkage mechanism on a second lateral surface side of the body frame together with a brake pedal. The shift operating system of the continuously variable transmission and the release operating system of the speed maintenance mechanism can thereby be disposed in a state of being distributed on the left and right of the body frame. As a result, assembly and maintenance of the shift operating system of the continuously variable transmission and the release operating system of the speed maintenance mechanism are more readily carried out, as compared with the case where these components are collectively disposed on either the left or right side of the body frame.

The release operating system of the speed maintenance mechanism consisting of the second mechanical linkage mechanism and the like is constituted on the second lateral surface side of the body frame. The operating force resulting from the brake pedal being pressed down can thus be conveyed directly to the speed maintenance mechanism on the second lateral surface side. The speed maintenance mechanism can thereby be more readily released, without adversely complicating the linkage structure for braking.

Accordingly, the operation of releasing the speed maintenance mechanism can be carried out efficiently and smoothly, while improving the ease with which the shift operating system of the continuously variable transmission and the release operating system of the speed maintenance mechanism are assembled and maintained, without complicating the linkage structure for braking.

In the above configuration, preferably the linkage shaft is constituted by a support shaft that supports the shift pedal in a state of rotating integrally with the shift pedal.

According to this configuration, simplification of the configuration, improvement in the ease of assembly and the like resulting from a reduction in the number of components and dual use of the shaft support structure can be achieved, as compared with the case where a dedicated linkage shaft for linking the shift pedal or the first mechanical linkage mechanism disposed on the first lateral surface side of the body frame to the speed maintenance mechanism disposed on the second lateral surface side of the body frame is provided.

In the above configuration, preferably the shift pedal has a forward operating portion for forward shifting and a reverse operating portion for reverse shifting, the speed maintenance mechanism has a swinging arm that rotates integrally with the linkage shaft, and a serrated engaging arm that holds the operating shaft at a given shift position by engaging the swinging arm, and the swinging arm, in a state where the forward operating portion is pressed down, is positioned in an engageable area where the swinging arm is engageable with the engaging arm, and, in a state where the reverse operating portion is pressed down, is positioned outside the engageable area where the swinging arm is not engageable with the engaging arm.

According to this configuration, simplification of the configuration can be achieved, as compared with the case where a dedicated shift pedal for forward shifting and a dedicated shift pedal for reverse shifting are provided. Also, with a configuration that only defines the swing positions of a swing arm that moves in tandem with the shift pedal being pressed down, the operating shaft can be engagedly held at a given shift position by the speed maintenance mechanism at the time of forward shifting, and the operating shaft being engagedly held at a given position by the speed maintenance mechanism can be prevented at the time of reverse shifting.

Accordingly, it is possible to enable constant-speed travel using the speed maintenance mechanism only at the time of forward travel, while achieving simplification of the configuration.

In the above configuration, preferably the vehicle speed operating device further comprises a braking maintenance mechanism disposed on the second lateral surface side and configured to maintain the brake in a braking state, the speed maintenance mechanism has a swinging arm configured to rotate integrally with the linkage shaft, and an engaging arm for speed maintenance configured to hold the operating shaft at a given shift position by engaging the swinging arm, the braking maintenance mechanism has an engaging arm for braking maintenance configured to maintain the brake in a braking state by engagedly holding the brake pedal at a pressed down position, and a single support member that supports the engaging arm for speed maintenance and the engaging arm for braking maintenance is provided on the body frame side.

According to this configuration, simplification of the configuration, improvement in the ease of assembly and the like resulting from a reduction in the number of components can be achieved, as compared with the case where a dedicated support member for supporting the engaging arm for speed maintenance and a dedicated support member for supporting the engaging arm for braking maintenance are provided.

In the above configuration, preferably a side brake for left braking configured to brake a left-hand travel device and a side brake for right braking configured to brake a right-hand travel device are provided as the brake, a brake pedal for left braking linked to the side brake for left braking and a brake pedal for right braking linked to the side brake for right braking are provided as the brake pedal, the brake pedal for left braking and the brake pedal for right braking are disposed laterally adjacent to each other, the second mechanical linkage mechanism includes a first link of which one end portion is pin-coupled to the brake pedal for left braking, a second link of which one end portion is pin-coupled to the brake pedal for right braking, and a third link that links the other end portion of the first link and the other end portion of the second link to the speed maintenance mechanism, and the second mechanical linkage mechanism is configured such that when a one-pedal pressing operation of the brake pedal for left braking or the brake pedal for right braking is carried out, an operating force at the time of the one-pedal pressing operation is absorbed and not conveyed to the speed maintenance mechanism, by relative swinging of the first link, the second link and the third link, and such that when a two-pedal pressing operation of the brake pedal for left braking and the brake pedal for right braking is carried out, an operating force at the time of the two-pedal pressing operation is conveyed to the speed maintenance mechanism, by integrated displacement of the first link, the second link and the third link.

According to this configuration, when a one-pedal pressing operation of pressing down only one of the side brakes is carried out in a constant-speed travel state in which the operating shaft of the continuously variable transmission is held at a given shift position by the speed maintenance mechanism, the corresponding travel device can be braked by the side brake corresponding to the brake pedal that was pressed in carrying out the one-pedal pressing operation, while the constant-speed travel state is maintained by the speed maintenance mechanism under the action of the second mechanical linkage mechanism. Brake turning with the travel device corresponding to the brake pedal that was pressed in carrying out the one-pedal pressing operation on the inside of the turn can thereby be performed.

Furthermore, when a two-pedal pressing operation of pressing down the left and right side brakes is carried out in the constant-speed travel state maintained by the speed maintenance mechanism, the left and right travel devices can be braked by the left and right side brakes, while the constant-speed travel state maintained by the speed maintenance mechanism is released under the action of the second mechanical linkage mechanism. The left and right side brakes can thereby be operated in a load-free state in which the constant-speed travel state maintained by the speed maintenance mechanism is released, enabling brake deceleration of the vehicle speed to be performed smoothly.

Accordingly, brake turning due to a one-pedal pressing operation of the left or right brake pedal and brake deceleration due to a two-pedal pressing operation of the left and right brake pedals can thereby be appropriately performed.

BRIEF DESCRIPTION OF THE DRAWINGS

FIG. 3 is a right side perspective view of a principal portion showing linkage of a shift pedal and brake pedals with a speed maintenance mechanism, and the like.
FIG. 4 is a vertical cross-sectional rear view of a principal portion showing linkage of a shift pedal and brake pedals with a speed maintenance mechanism, and the like.
FIG. 5 is a plan view of a principal portion showing linkage of a shift pedal and brake pedals with a speed maintenance mechanism, and the like.
FIG. 6 is a perspective view of a principal portion showing linkage of a shift pedal and brake pedals with a speed maintenance mechanism, and the like.

DETAILED DESCRIPTION OF PREFERRED EMBODIMENTS

Hereinafter, embodiments in which a vehicle speed operating device for a work vehicle according to the present invention is applied to a tractor serving as an exemplary work vehicle will be described, with reference to the drawings.

Figure 1:
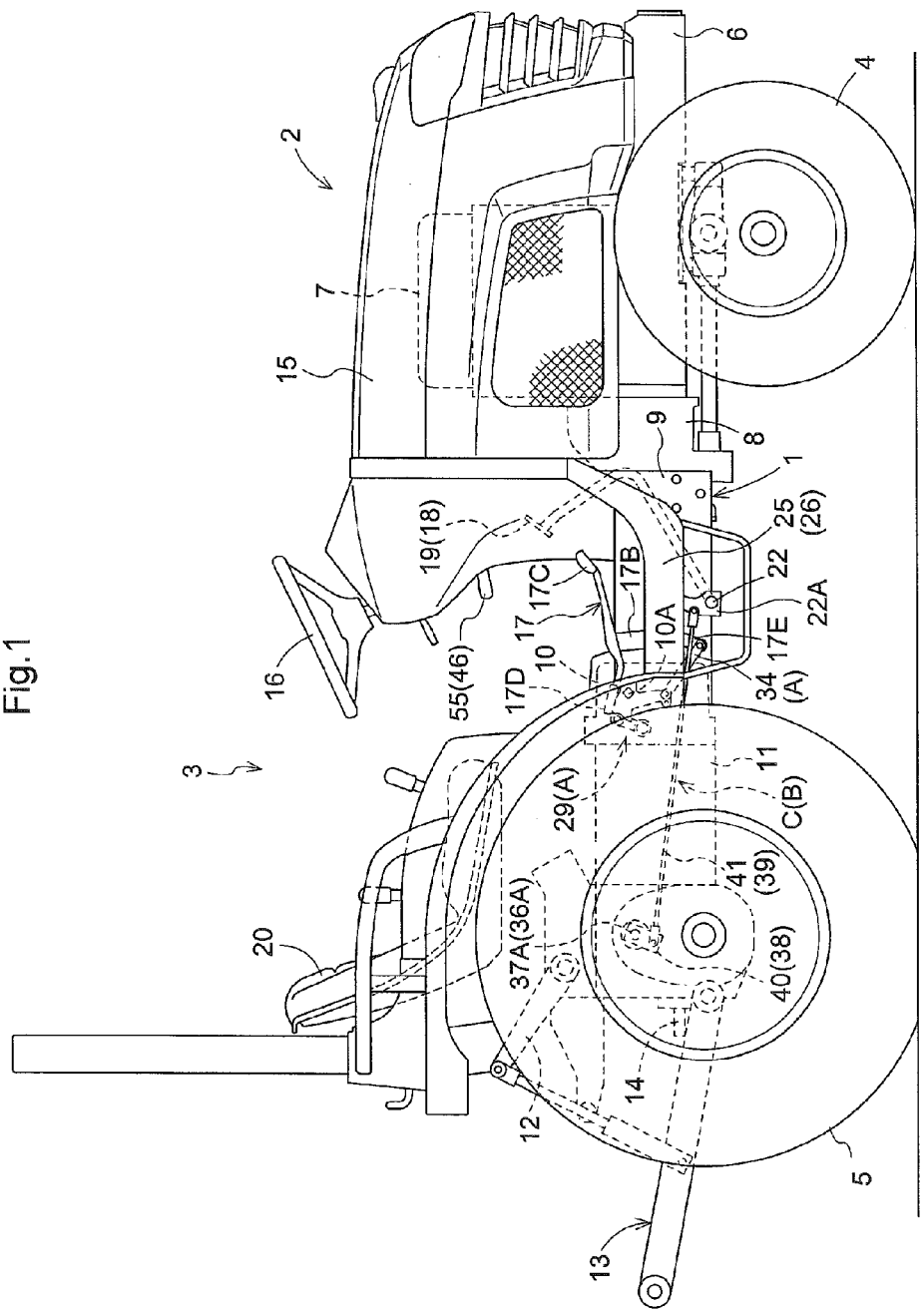
FIG. 1 is a right side view of a tractor.
Figure 2:
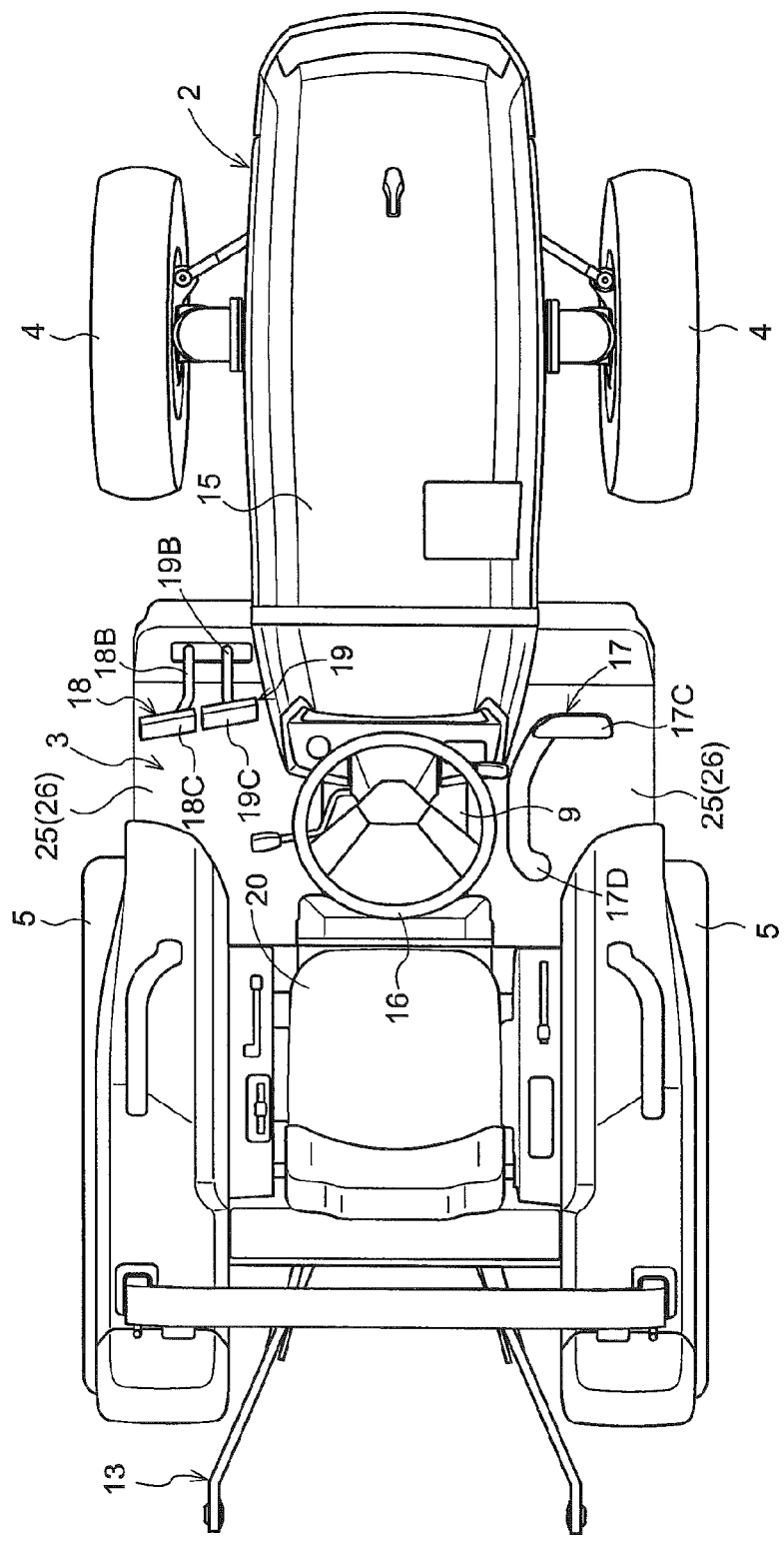
FIG. 2 is a plan view of a tractor.

As shown in FIGS. 1 and 2, a tractor illustrated in the present embodiment is provided with an engine part 2 in a front half of a body frame 1, and a boarding/driving part 3 is formed in a back half of the body frame 1. Also, the tractor is constituted as a four-wheel drive tractor by disposing front wheels 4 serving as steering wheels that can be driven on the left and right of the engine part 2, and disposing rear wheels 5 serving as travel devices that can be driven and braked on the left and right of the boarding/driving part 3.

As shown in FIG. 1, the body frame 1 is constituted by mounting a water-cooled engine 7 to a rear portion of a front frame member 6, mounting a clutch housing 8 to a lower rear portion of the engine 7, mounting a hydrostatic continuously variable transmission (hereinafter "HST") 10 to a rear end portion of the clutch housing 8 via an intermediate frame member 9 made from sheet metal, and mounting a transmission case (hereinafter "T/M case") 11 to a rear end portion of the HST 10.

As shown in FIGS. 1 and 2, on a rear portion of the UM case 11 are disposed a left and right pair of lift arms 12 capable of lifting and lowering a work device (not shown) such as a rotary tiller, a plough or the like that is mounted to a rear portion of the tractor, link mechanisms 13 that swing in tandem with these lift arms 12, a PTO shaft 14 capable of drawing work power out to the work device in the case where a driven work device such as a rotary tiller or the like is mounted to the rear portion of the tractor, and the like.

The engine part 2 is constituted by disposing the engine 7, peripheral devices (not shown) and the like in an engine room formed by disposing a bonnet 15 on the front half of the body frame 1. Although not shown, power from the engine 7 is transmitted to the HST 10 via a main clutch built into the clutch housing 8, and the like. Power after shifting by the HST 10 drawn from an output shaft of the HST 10 is then transmitted, for use in travel, to the left and right front wheels 4 and the left and right rear wheels 5 via a travel transmission system built into the T/M case 11 and the like. Also, power before shifting by the HST 10 drawn from an input shaft of the HST 10 is transmitted, for use in work, to the PTO shaft 14 via the PTO transmission system built into the T/M case 11 and the like.

As shown in FIGS. 1 to 6, the boarding/driving part 3 is constituted by disposing a steering wheel 16 for steering the front wheels, a shift pedal 17 for shifting, a brake pedal 18 for left braking, a brake pedal 19 for right braking, a position-adjustable driving seat 20, and the like. The shift pedal 17 is T-shaped in side view and is provided with a boss portion 17A that is fitted onto a laterally-oriented first support shaft 21 provided on the intermediate frame member 9, a support portion 17B extending upward from the boss portion 17A, a forward operating portion 17C extending frontward from the support portion 17B, a reverse operating portion 17D extending rearward from the support portion 17B, and the like. The shift pedal 17 is disposed in a right foot portion of the boarding/driving part 3 that is located on the right lateral surface side (first lateral surface side) of the body frame 1, in a state of being swingable with the first support shaft 21 as the fulcrum. The brake pedals 18 and 19 are respectively constituted by boss portions 18A and 19A that are fitted onto a laterally-oriented second support shaft 22 provided on the intermediate frame member 9, laterally-inclined V-shaped arm portions 18B and 19B extending upward from and in front of the boss portions 18A and 19A, operating portions 18C and 19C provided at the extended ends of the arm portions 18B and 19B, and the like. The brake pedals 18 and 19 are arranged on the left and right of each other in a state where the brake pedal 19 for right braking is located on the right of the brake pedal 18 for left braking, in a left foot portion of the boarding/driving part 3 that is located on the left lateral surface side (second lateral surface side) of the body frame 1, so as to enable an independent swinging operation resulting from one-pedal pressing and an integrated swinging operation resulting from two-pedal pressing with the second support shaft 22 as the fulcrum.

The intermediate frame member 9 has a longitudinally-oriented tubular shape and is provided with a ceiling wall portion 9A, sidewall portions 9B and 9C, and a bottom wall portion 9D, by welding a baseplate member 24 to a main member 23 that has been bent into an inverted U-shape in longitudinal view. A boarding step 26 is constituted by the ceiling wall portion 9A of the intermediate frame member 9 and sidestep members 25 made from sheet metal, by respectively bolting the left and right sidestep members 25 to upper end portions of the left and right sidewall portions 9B and 9C.

A first shaft support member 27 consisting of a steel round pipe material that supports the first support shaft 21 is welded in position on a lower rear side on the inside of the intermediate frame member 9, so as to be oriented laterally and span the left and right sidewall portions 9B and 9C. Also, a second shaft support member 28 consisting of a steel round pipe material that supports the second support shaft 22 is welded in position on a lower side of the bottom wall portion 9D of the intermediate frame member 9, so as to be oriented laterally and span the left and right sidewall portions 9B and 9C.

The HST 10 is mounted to a front end portion of the UM case 11, in a posture set such that an operating shaft 10A of a pump swash plate (not shown) thereof extends laterally to the right of the body frame 1. A neutral biasing mechanism 29 by which the operating shaft 10A is returned to and held at a neutral position is provided on a right side portion of the HST 10. The neutral biasing mechanism 29 is constituted by an operating arm 30 that is coupled to the operating shaft 10A of the HST 10 so as to rotate integrally with the operating shaft 10A, a roller 31 that engages a cam portion 30A recessed into a V-shape in the operating arm 30, a swinging arm 32 of which a free end portion is coupled to the roller 31, a tension spring 33 that biases the swinging of the swinging arm 32 in a direction that engages the roller 31 in the cam portion 30A, and the like, such that the operating shaft 10A is returned to and held at a neutral position by the biasing action of the tension spring 33 and the guiding action of the cam portion 30A. A free end portion of the operating arm 30 is linked to a linkage portion 17E that is provided hanging down from the boss portion 17A of the shift pedal 17, via a tabular band-like linkage member 34. In other words, a first mechanical linkage mechanism A for shifting that links the shift pedal 17 to the operating shaft 10A of the HST 10 is constituted by the neutral biasing mechanism 29, the linkage member 34, and the like.

As a result of the above configuration, when, in a neutral state where the shift pedal 17 is in a neutral position together with the operating shaft 10A under the action of the neutral biasing mechanism 29, the forward operating portion 17C of the shift pedal 17 is operated in the pressing down direction against the action of the neutral biasing mechanism 29, the operating shaft 10A of the HST 10 can, in tandem with this operation, be rotationally operated in a forward acceleration direction by an operating amount that depends on the amount by which the forward operating portion 17C is pressed down. When, in this forward acceleration state, the forward operating portion 17C of the shift pedal 17 is operated in the press-down release direction utilizing the action of the neutral biasing mechanism 29, the operating shaft 10A of the HST 10 can be rotationally operated in a forward deceleration direction by an operating amount that depends on the amount by which the pressing down of the forward operating portion 17C is released. On the other hand, when, in the aforementioned neutral state, the reverse operating portion 17D of the shift pedal 17 is operated in the pressing down direction against the action of the neutral biasing mechanism 29, the operating shaft 10A of the HST 10 can, in tandem with this operation, be rotationally operated in the reverse acceleration direction by an operating amount that depends on the amount by which the reverse operating portion 17D is pressed down. When, in this reverse acceleration state, the reverse operating portion 17D of the shift pedal 17 is operated in the press-down release direction utilizing the action of the neutral biasing mechanism 29, the operating shaft 10A of the HST 10 can be rotationally operated in the reverse deceleration direction by an operating amount that depends on the amount by which pressing down of the reverse operating portion 17D is released.

Figure 3:
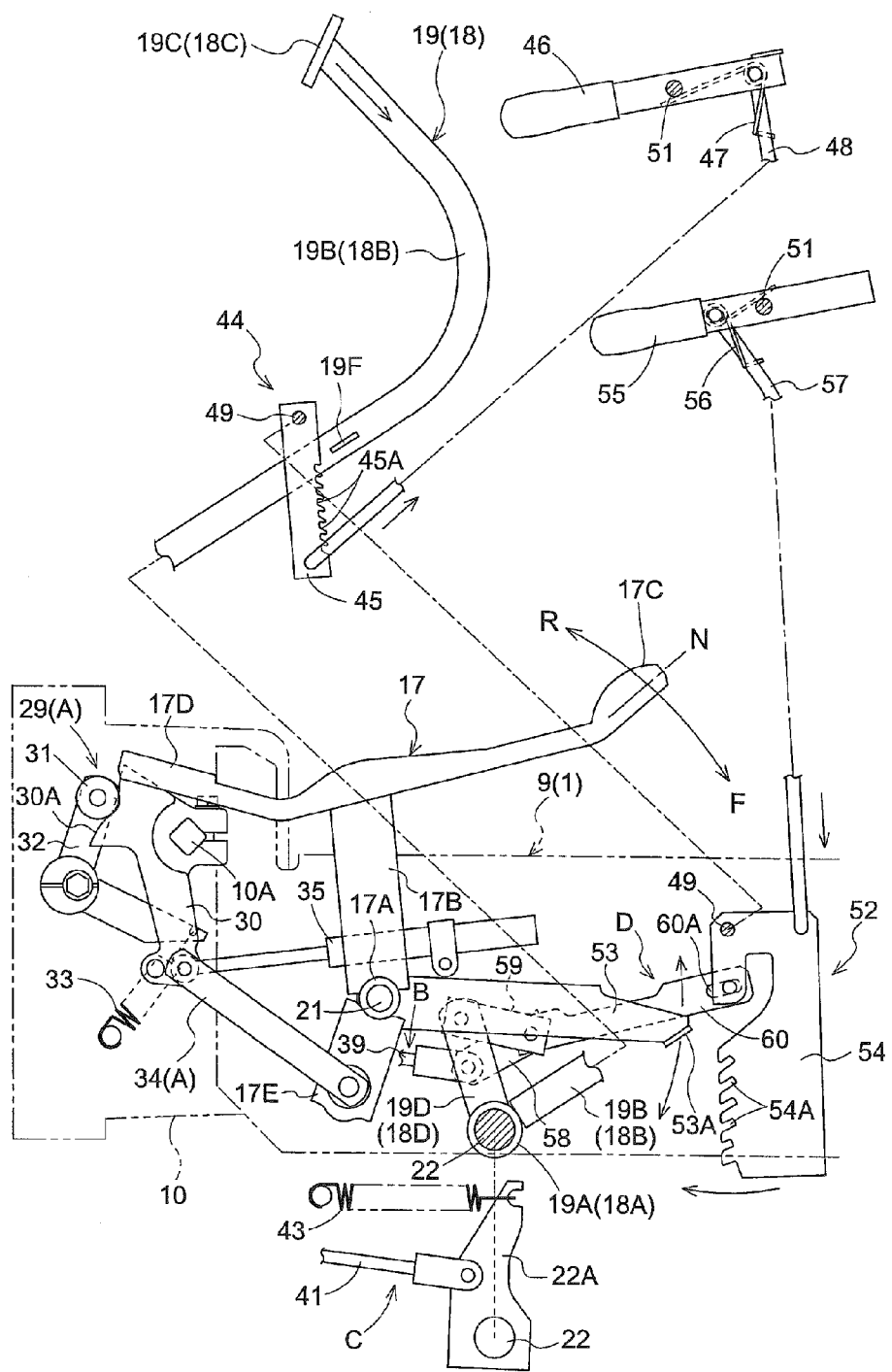

As shown in FIG. 3, the shift pedal 17 is prevented from vibrating due to the drive vibrations of the HST 10 by a damper 35 that bridges between the free end portion of the operating arm 30 and the right sidewall portion 9C of the intermediate frame member 9.

As shown in FIGS. 3 to 6, the second support shaft 22 that supports the left and right brake pedals 18 and 19 is rotatably fitted into the second shaft support member 28 of the intermediate frame member 9, in a state of passing laterally through the intermediate frame member 9. The boss portion 18A of the brake pedal 18 for left braking is relatively rotatably fitted onto a left side region of the left end portion of the second support shaft 22 that projects laterally to the left from the intermediate frame member 9 below the left-hand sidestep member 25, and the boss portion 19A of the brake pedal 19 for right braking is fitted onto a right side region of the left end portion so as to rotate integrally with the second support shaft 22. Also, a linkage arm 22A is provided, below the right-hand sidestep member 25, in a standing manner on a right end portion of the second support shaft 22 that projects laterally to the right from the intermediate frame member 9, in a state of rotating integrally with the second support shaft 22.

Inside the T/M case 11, a side brake 36 for left braking that brakes the left-hand rear wheel 5 and a side brake 37 for right braking that brakes the right-hand rear wheel 5 are disposed so as to be distributed on the left and right. The left-hand side brake 36 links an operating shaft 36A thereof to a linkage portion 18D installed in a standing manner on the boss portion 18A of the left-hand brake pedal 18, via a mechanical linkage mechanism B for left braking. The right-hand side brake 37 links an operating shaft 37A to the linkage arm 22A via a mechanical linkage mechanism C for right braking. The mechanical linkage mechanism B for left braking is constituted by an operating arm 38 coupled to the operating shaft 36A of the left-hand side brake 36 so as to rotate integrally with the operating shaft 36A, a length-adjustable turnbuckle-type linkage rod 39 that spans from the operating arm 38 to the linkage portion 18D of the left-hand brake pedal 18, and the like. The mechanical linkage mechanism C for right braking is constituted by an operating arm 40 coupled to the operating shaft 37A of the right-hand side brake 37 so as to rotate integrally with the operating shaft 37A, a length-adjustable turnbuckle-type linkage rod 41 that spans from the operating arm 40 to the linkage arm 22A, and the like. The left-hand brake pedal 18 is constituted so as to automatically return to the release position under the action of a tension spring 42 that bridges between the linkage portion 18D and the left sidewall portion 9B of the intermediate frame member 9. The right-hand brake pedal 19 is constituted so as to automatically return to the release position under the action of a tension spring 43 that bridges between the linkage arm 22A and the right sidewall portion 9C of the intermediate frame member 9.

As a result of the above configuration, when a one-pedal pressing operation of the left-hand brake pedal 18 is carried out while the tractor is traveling in a straight line, the left-hand rear wheel 5 can be braked by the left-hand side brake 36, thereby enabling the travel state to be switched from traveling in a straight line to a left brake turning state of braking the left-hand rear wheel 5 and turning to the left. On the other hand, when a one-pedal pressing operation of the right-hand brake pedal 19 is carried out while the tractor is traveling in a straight line, the right-hand rear wheel 5 can be braked by the right-hand side brake 37, thereby enabling the travel state to be switched from traveling in a straight line to a right brake turning state of braking the right-hand rear wheel 5 and turning to the right. Also, when a two-pedal pressing operation of the left and right brake pedals 18 and 19 is carried out, the left and right rear wheels 5 can be braked by the left and right side brakes 36 and 37, thereby enabling the vehicle speed to be decelerated by braking.

Figure 4:
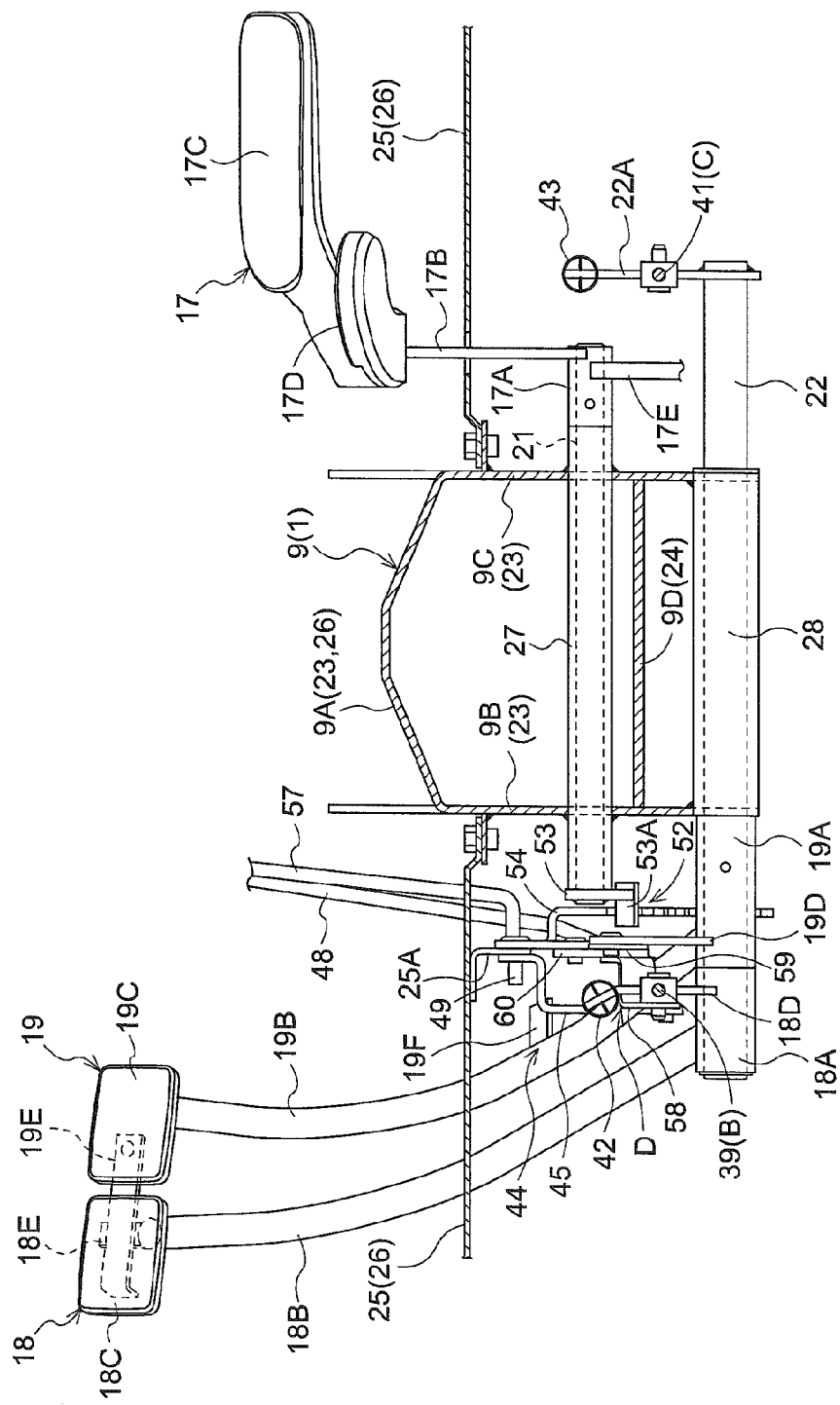
Figure 5:
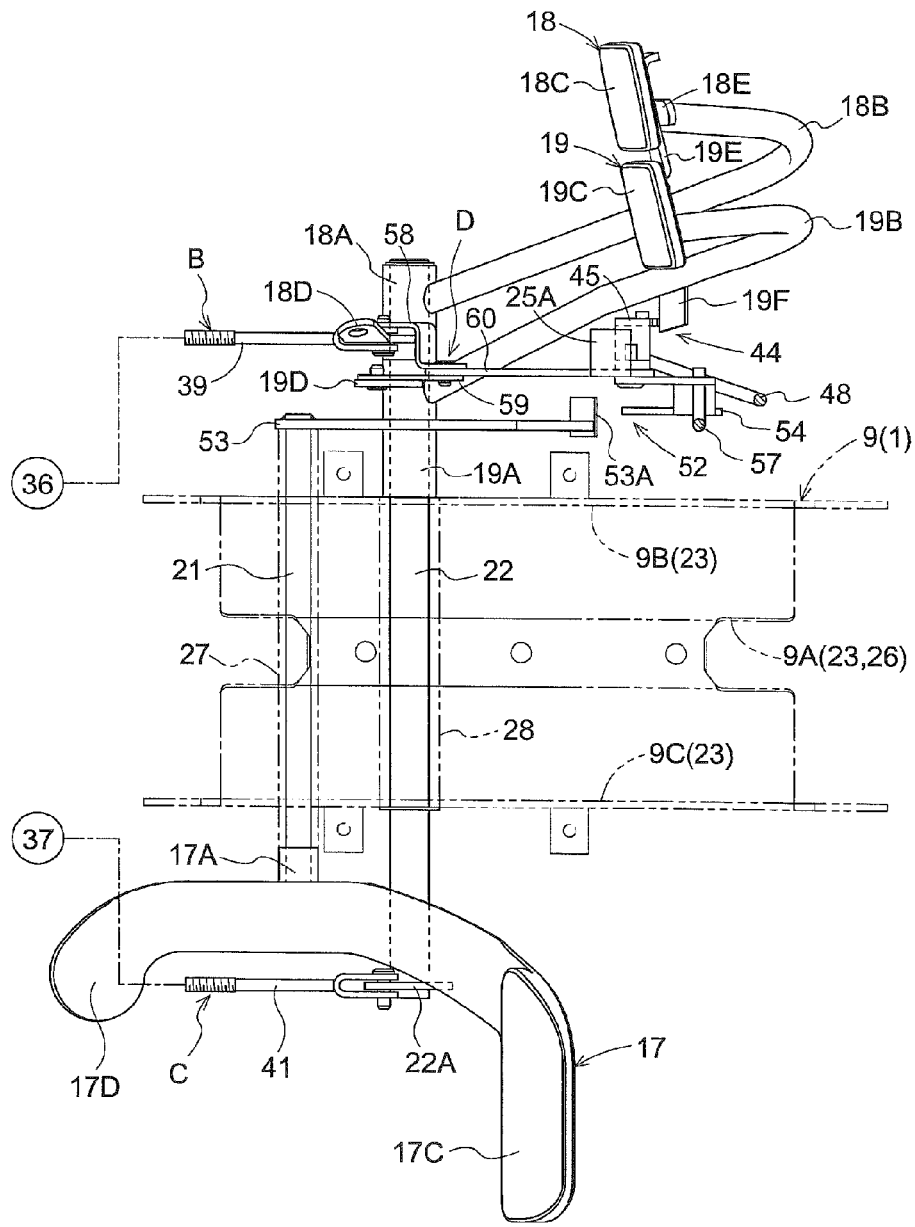

As shown in FIGS. 4 and 5, the left and right brake pedals 18 and 19 can be engagedly coupled in a state where both brake pedals swing in an integrated manner, by engaging a swinging engaging implement 19E provided on an operating portion 19C of the right-hand brake pedal 19 with an engaging implement 18E provided on the operating portion 18C of the left-hand brake pedal 18. In other words, by engagedly coupling the left and right brake pedals 18 and 19 when the tractor is traveling at speed on a road or the like, it is possible, even in the case where a one-pedal pressing operation of the left brake pedal 18 or the right brake pedal 19 is carried out, to prevent brake turning from being performed during high-speed travel based on this operation.

As shown in FIGS. 3 to 6, the tractor is equipped with a braking maintenance mechanism 44 that causes the left and right side brakes 36 and 37 to function as a parking brake, by engagedly holding the engagedly coupled left and right brake pedals 18 and 19 in a braking operation area and maintaining the left and right side brakes 36 and 37 in a braking state.

The braking maintenance mechanism 44 is constituted by an engaging piece 19F that extends to the right from the arm portion 19B of the right-hand brake pedal 19 below the left-hand sidestep member 25, a serrated engaging arm 45 in which a plurality of recessed engaging portions 45A capable of engaging the engaging piece 19F are vertically aligned, a parking lever 46 that is disposed below the steering wheel 16 of the boarding/driving part 3 so as to be swingable up and down, a torsion spring 47 that upwardly biases the swinging of the parking lever 46, a linkage rod 48 that links the engaging arm 45 and the parking lever 46 in an interlocked manner, and the like.

The engaging arm 45 is disposed, in a state of being swingable backwards and forwards, in rearward proximity to the engaging piece 19F provided on the right-hand brake pedal 19, by being coupled to a support member 25A provided hanging down from the left-hand sidestep member 25, via a laterally-oriented support pin 49 and the like. The parking lever 46 is fitted, at a longitudinally intermediate portion thereof, onto a laterally-oriented support shaft 51 provided on a support frame 50 that supports the steering wheel 16 and the like, in a manner that enables the parking lever 46 to be swung up to a release position and down to a holding position. The support frame 50 is provided in a standing manner on a front end portion of the intermediate frame member 9. The torsion spring 47 is fitted onto a laterally-oriented pivot portion of the linkage rod 48 that is pivotally coupled to a front end portion of the parking lever 46, and bridges between the linkage rod 48 and the support shaft 51. The linkage rod 48 links the engaging arm 45 to the parking lever 46, such that the engaging arm 45 is swingingly displaced forward to an engagement position where the engaging arm 45 is engageable the engaging piece 19F, in tandem with the parking lever 46 being swung to the holding position, and such that the engaging arm 45 is swingingly displaced rearward to a retraction position where the engaging arm 45 is not engageable with the engaging piece 19F, in tandem with the parking lever 46 being swung to the release position. The engaging piece 19F and the engaging arm 45 are held in an engaged state under the action of the left and right tension springs 42 and 43 that respectively bias the left and right brake pedals 18 and 19 to return to the press-down release position, against the action of the torsion spring 47 that biases the parking lever 46 to return to the release position.

As a result of the above configuration, when, in a state where the engagedly coupled left and right brake pedals 18 and 19 are pressed down to a given operation position in the braking operation area, the parking lever 46 is swung from the release position to the holding position against the action of the torsion spring 47 for the parking lever, the engaging arm 45, in tandem with this operation, is swingingly displaced from the retraction position to the engagement position, and one of the recessed engaging portions 45A in the engaging arm 45 engages the engaging piece 19F of the right-hand brake pedal 19. This engaged state can then be held under the action of the left and right brake pedal tension springs 42 and 43 for the brake pedals. The left and right brake pedals 18 and 19 can thereby be engagedly held at a given braking operation position, enabling the left and right side brakes 36 and 37 to be operated as a parking brake. When the engagedly coupled left and right brake pedals 18 and 19 are then pressed down in this parking state, the engaging piece 19F of the right-hand brake pedal 19 disengages from the recessed engaging portions 45A of the engaging arm 45 following this pressing down operation, and, at the same time, the parking lever 46 swings to return from the holding position to the release position under the action of the parking lever torsion spring 47. The engaging arm 45 then swings to return from the engagement position to the retraction position in tandem with the return swinging of the parking lever 46, enabling the engaging piece 19F and the engaging arm 45 to be held in an engagement release state. The left and right side brakes 36 and 37 can thereby be stopped from function as a parking brake.

As shown in FIGS. 3 to 6, the tractor is provided with a speed maintenance mechanism 52 that causes the tractor to travel forward at a given constant speed, by engagedly holding the shift pedal 17 in a forward shift operation area and maintaining the HST 10 in a given forward shift state.

The speed maintenance mechanism 52 is constituted by a forward-oriented swinging arm 53 that swings integrally with the shift pedal 17, a serrated engaging arm 54 in which a plurality of recessed engaging portions 54A capable of engaging an engaging piece 53A provided on a free end portion (front end portion) of the swinging arm 53 are vertically aligned, a constant speed lever 55 provided so as to be swingable up and down below the steering wheel 16 of the boarding/driving part 3, a torsion spring 56 that upwardly biases the swinging of the constant speed lever 55, a linkage rod 57 that links the engaging arm 54 and the constant speed lever 55, and the like.

The swinging arm 53 is constituted so as to swing integrally with the shift pedal 17 via the first support shaft 21 that supports the shift pedal 17. The first support shaft 21 is rotatably fitted into the first shaft support member 27 of the intermediate frame member 9, in a state of passing laterally through the intermediate frame member 9. The boss portion 17A of the shift pedal 17 is fitted onto a right end portion (first projecting end portion) of the first support shaft 21 that projects laterally to the right from the right lateral surface (first lateral surface) of the intermediate frame member 9 below the right-hand sidestep member 25, and the swinging arm 53 of the speed maintenance mechanism 52 is fitted onto a left end portion (second projecting end portion) of the first support shaft 21 that projects laterally to the left from the left lateral surface (second lateral surface) of the intermediate frame member 9 below the left-hand sidestep member 25. In other words, the first support shaft 21 functions as a linkage shaft that links the shift pedal 17 disposed on the right lateral surface side (first lateral surface side) of the body frame 1 and the speed maintenance mechanism 52 disposed on the left lateral surface side (second lateral surface side) of the body frame 1. The swinging arm 53 positioned under the left-hand sidestep member 25 thereby swings up and down with the first support shaft 21 as the fulcrum, in tandem with the shift pedal 17 disposed in the right foot portion of the boarding/driving part 3 being pressed down. In the case where the forward operating portion 17C of the shift pedal 17 is pressed down, the engaging piece 53A of the swinging arm 53 is positioned within an engageable area where the engaging piece 53A is engageable with one of the recessed engaging portions 54A of the engaging arms 54, and, in the case where the reverse operating portion 17D of the shift pedal 17 is pressed down, the engaging piece 53A of the swinging arm 53 is positioned outside the engageable area where the engaging piece 53A is not engageable with any of the recessed engaging portions 54A of the engaging arm 54 (area higher up than engageable area).

The engaging arm 54 is disposed, in a state of being swingable backwards and forwards, in forward proximity to the engaging piece 53A provided on the front end portion of the swinging arm 53, by being coupled to the support member 25A provided on the left-hand sidestep member 25, via the support pin 49 and the like, together with the engaging arm 45 of the braking maintenance mechanism 44. The constant speed lever 55 is fitted, at a longitudinally intermediate portion thereof, onto the support shaft 51 provided on the support frame 50, together with the parking lever 46, in a manner that enables the constant speed lever 55 to be swung up to a release position and down to a holding position. The torsion spring 56 is fitted onto a laterally-oriented pivot portion of the linkage rod 57 that is pivotally coupled to a rearward side of the constant speed lever 55, and bridges between the support shaft 51 and the linkage rod 57. The linkage rod 57 links the engaging arm 54 to the constant speed lever 55, such that the engaging arm 54 is swingingly displaced backward to an engagement position where the engaging arm 54 is engageable with the engaging piece 53A, in tandem with the constant speed lever 55 being swung to the holding position, and such that the engaging arm 54 is swingingly displaced forward to a retraction position where the engaging arm 54 is not engageable with the engaging piece 53A, in tandem with the constant speed lever 55 being swung to the release position. The engaging piece 53A and the engaging arm 54 are held in an engaged state under the action of the neutral biasing mechanism 29, against the action of the torsion spring 56 that biases the constant speed lever 55 to return to the release position.

In other words, the speed maintenance mechanism 52 is provided on the left lateral surface side of the body frame 1 together with the braking maintenance mechanism 44, in a state where the support structure of the engaging arm 45 in the braking maintenance mechanism 44 is used as the support structure of the engaging arm 54 in the speed maintenance mechanism 52 and the support structure of the parking lever 46 in the braking maintenance mechanism 44 is used as the support structure of the constant speed lever 55 in the speed maintenance mechanism 52.

As a result of the above configuration, when, in a state where the shift pedal 17 is pressed down to a given operation position in a forward shift operation area, the constant speed lever 55 is swung from the release position to the holding position against the action of the torsion spring 56 for the constant speed lever, the engaging arm 54, in tandem with this operation, is swingingly displaced from the retraction position to the engagement position, and one of the recessed engaging portions 54A in the engaging arm 54 engages the engaging piece 53A of the swinging arm 53, which is positioned within the engageable area. This engaged state can then be held under the action of the neutral biasing mechanism 29. The shift pedal 17 can thereby be engagedly held at a given forward shift position, enabling the operating shaft 10A of the HST 10 to be maintained at a given forward shift position. When the shift pedal 17 is then pressed down in this constant-speed forward travel state, the engaging piece 53A of the swinging arm 53 disengages from the recessed engaging portions 54A of the engaging arm 54 following this pressing down operation, and, at the same time, the constant speed lever 55 swings to return from the holding position to the release position under the action of the torsion spring 56 for the constant speed lever. The engaging arm 54 then swings to return from the engagement position to the retraction position in tandem with the return swinging of the constant speed lever 55, enabling the engaging piece 53A and the engaging arm 54 to be held in an engagement release state. The constant-speed forward travel state can thereby be released.

As shown in FIGS. 3 to 6, the speed maintenance mechanism 52 is linked to the left and right brake pedals 18 and 19 via a second mechanical linkage mechanism D for constant-speed forward travel release. The second mechanical linkage mechanism D is constituted by a tabular band-like first link 58 of which a rear end portion is pin-coupled to the linkage portion 18D of the left-hand brake pedal 18, a tabular band-like second link 59 of which a rear end portion is pin-coupled to a linkage portion 19D provided in a standing manner on the boss portion 19A of the right-hand brake pedal 19, a longitudinally-oriented third link 60 that pin couples a front end portion of the first link 58 and a front end portion of the second link 59 to the engaging arm 54 of the speed maintenance mechanism 52, and the like. The second mechanical linkage mechanism D is constituted so as to span from the linkage portions 18D and 19D of the left and right brake pedals 18 and 19 to the engaging arm 54 of the speed maintenance mechanism 52, in a Y-shape in side view such that the coupling point between the left-hand brake pedal 18 and the first link 58 is lower down than the coupling point between the right-hand brake pedal 19 and the second link 59, in a state where the left and right brake pedals 18 and 19 are in the press-down release position.

As a result of the above configuration, in the case where a one-pedal pressing operation of the left or right brake pedals 18 and 19 is carried out in the constant-speed forward travel state maintained by the speed maintenance mechanism 52, the links 58 to 60 swing relatively following this one-pedal pressing operation, enabling the operating force at this time to be absorbed by the second mechanical linkage mechanism D. The engaging arm 54 of the speed maintenance mechanism 52 can thereby be held at the engagement position, enabling the constant-speed forward travel state to be maintained. As a result, the travel state can be switched from the constant-speed forward travel state to a brake turning state in which either the left side brake 36 or the right side brake 37 is operated while maintaining this constant-speed forward travel state.

Also, in the case where a two-pedal pressing operation of the left and right brake pedals 18 and 19 is carried out, the links 58 to 60 are displaced forward in an integrated manner following this two-pedal pressing operation, enabling the operating force at this time to be linearly conveyed to the engaging arm 54 of the speed maintenance mechanism 52 via the second mechanical linkage mechanism D. The engaging arm 54 of the speed maintenance mechanism 52 can thereby be displaced by a pressing force from the engagement position to the retraction position against the action of the neutral biasing mechanism 29, enabling the constant-speed forward travel state to be released. As a result, the left and right side brakes 36 and 37 can be operated in a load-free state in which the constant-speed forward travel state is released, enabling brake deceleration of vehicle speed to be performed smoothly.

As shown in FIGS. 3 and 6, the second mechanical linkage mechanism D has a laterally-oriented long hole 60A formed in a front end portion of the third link 60. The front end portion of the third link 60 is pin-coupled to the engaging arm 54 of the speed maintenance mechanism 52 using this long hole 60A, allowing for swinging displacement of the engaging arm 54 from the retraction position backward to the engagement position relative to the third link 60 due to the constant speed lever 55 being operated in a state where the left and right brake pedals 18 and 19 are in the press-down release position, and allowing for sliding displacement of the third link 60 forward relative to the engaging arm 54 due to the two-pedal pressing operation of the left and right brake pedals 18 and 19 being carried out in a state where the constant speed lever 55 is in the release position and the engaging arm 54 is in the retraction position.

Other Embodiments

[1] The work vehicle need not be a tractor, and may be a ride-on rice transplanter, a ride-on lawnmower, or the like, for example.

[2] The body frame 1 need not be provided with the intermediate frame member 9, and may constituted by mounting the T/M case 11 to a rear end portion of the clutch housing 8, for example.

[3] Crawler-type travel devices or the like, for example, may be employed as the left and right travel devices 5.

[4] A belt-type continuously variable transmission, a hydromechanical continuously variable transmission (HMT) or the like, for example, may be employed as the continuously variable transmission 10.

[5] The shift pedal 17 may be constituted by providing a dedicated shift pedal for forward shifting and a dedicated shift pedal for reverse shifting, for example.

[6] A configuration may be adopted in which a single brake for braking the left and right travel devices 5 and a single brake pedal that is linked to this brake are provided.

[7] The first mechanical linkage mechanism A may be constituted by linking the operating shaft 10A of the continuously variable transmission 10 and the shift pedal 17 via a linkage wire or the like, for example.

[8] A configuration may be adopted in which the linkage shaft 21 is rotatably provided on the UM case 11 constituting the body frame 1, in a state of passing laterally through the UM case 11, for example.

[9] A configuration may be adopted in which the first mechanical linkage mechanism A, rather than the shift pedal 17, is attached to the first projecting end portion of the linkage shaft 21. Also, a configuration may be adopted in which the shift pedal 17 and the first mechanical linkage mechanism A are both attached.

[10] A configuration may be adopted in which a dedicated linkage shaft 21 for linking the speed maintenance mechanism 52 disposed on the left lateral surface side of the body frame 1 to one or both of the shift pedal 17 and the first mechanical linkage mechanism A disposed on the right lateral surface side of the body frame 1 is provided separately to the first support shaft 21 of the shift pedal 17.

[11] A configuration may be adopted in which the shift pedal 17, the first mechanical linkage mechanism A and the like are disposed on the left lateral surface side of the body frame 1, and the brake pedals 18 and 19, the speed maintenance mechanism 52, the second mechanical linkage mechanism D and the like are disposed on the right lateral surface side of the body frame 1.

[12] A configuration may be adopted in which, in the speed maintenance mechanism 52, the swinging arm 53 is provided on the body frame side and the serrated engaging arm 54 for engaging the swinging arm 53 is provided on the linkage shaft 21, for example.

[13] A configuration may be adopted in which, in the braking maintenance mechanism 44, the plurality of recessed engaging portions 45A are formed and aligned on the brake pedal side and a swinging arm provided with an engaging piece capable of engaging these recessed engaging portions 45A is mounted on the body frame side, for example.

[14] A configuration may be adopted in which a dedicated support member 25A for supporting the engaging arm 54 for speed maintenance and a dedicated support member 25A for supporting the engaging arm 45 for braking maintenance are provided. Also, a configuration may be adopted in which the support member 25A is provided on the body frame 1.

What is claimed is:

1. A vehicle speed operating device for a work vehicle having a body frame, a travel device and a brake for braking the travel device, comprising:
    a continuously variable transmission having an operating shaft;
    a shift pedal disposed on a first lateral surface side that is one of left and right lateral surfaces of the body frame;
    a first mechanical linkage mechanism linking the shift pedal on the first lateral surface side to the operating shaft;
    a brake pedal disposed on a second lateral surface side that is the other of the left and right lateral surfaces of the body frame, and linked to the brake;
    a linkage shaft rotatably provided on the body frame and passing laterally through the body frame;
    a first projecting end portion, of the linkage shaft, projecting from the first lateral surface and having attached thereto one or both of the shift pedal and the first mechanical linkage mechanism;
    a second projecting end portion, of the linkage shaft, projecting from the second lateral surface;
    a speed maintenance mechanism linked to the second projecting end portion with a configuration capable of holding the operating shaft at a given shift position via the linkage shaft, and disposed on the second lateral surface side; and
    a second mechanical linkage mechanism disposed on the second lateral surface side, and linking the brake pedal to the speed maintenance mechanism, such that the speed maintenance mechanism is switched from a state of holding the operating shaft at a given shift position to a state of releasing the holding, in tandem with the brake pedal being pressed down.

2. The vehicle speed operating device for a work vehicle according to claim 1,
    wherein the linkage shaft is constituted by a support shaft that supports the shift pedal in a state of rotating integrally with the shift pedal.

3. The vehicle speed operating device for a work vehicle according to claim 1,
    wherein the shift pedal has a forward operating portion for forward shifting and a reverse operating portion for reverse shifting,
    wherein the speed maintenance mechanism has a swinging arm that rotates integrally with the linkage shaft, and a serrated engaging arm that holds the operating shaft at a given shift position by engaging the swinging arm, and
    wherein the swinging arm, in a state where the forward operating portion is pressed down, is positioned in an engageable area where the swinging arm is engageable with the engaging arm, and, in a state where the reverse operating portion is pressed down, is positioned outside the engageable area where the swinging arm is not engageable with the engaging arm.

4. The vehicle speed operating device for a work vehicle according to claim 1, further comprising:
    a braking maintenance mechanism disposed on the second lateral surface side and configured to maintain the brake in a braking state, wherein the speed maintenance mechanism has a swinging arm configured to rotate integrally with the linkage shaft, and an engaging arm for speed maintenance configured to hold the operating shaft at a given shift position by engaging the swinging arm, wherein the braking maintenance mechanism has an engaging arm for braking maintenance configured to maintain the brake in a braking state by engagedly holding the brake pedal at a pressed down position, and wherein a single support member that supports the engaging arm for speed maintenance and the engaging arm for braking maintenance is provided on the body frame side.

5. The vehicle speed operating device for a work vehicle according to claim 1, wherein a side brake for left braking configured to brake a left-hand travel device and a side brake for right braking configured to brake a right-hand travel device are provided as the brake, wherein a brake pedal for left braking linked to the side brake for left braking and a brake pedal for right braking linked to the side brake for right braking are provided as the brake pedal, wherein the brake pedal for left braking and the brake pedal for right braking are disposed laterally adjacent to each other, wherein the second mechanical linkage mechanism includes a first link of which one end portion is pin-coupled to the brake pedal for left braking, a second link of which one end portion is pin-coupled to the brake pedal for right braking, and a third link that links the other end portion of the first link and the other end portion of the second link to the speed maintenance mechanism, and wherein the second mechanical linkage mechanism is configured such that when a one-pedal pressing operation of the brake pedal for left braking or the brake pedal for right braking is carried out, an operating force at the time of the one-pedal pressing operation is absorbed and not conveyed to the speed maintenance mechanism, by relative swinging of the first link, the second link and the third link, and such that when a two-pedal pressing operation of the brake pedal for left braking and the brake pedal for right braking is carried out, an operating force at the time of the two-pedal pressing operation is conveyed to the speed maintenance mechanism, by integrated displacement of the first link, the second link and the third link.

* * * * *